(12) United States Patent
Bajgar

(10) Patent No.: US 12,092,496 B2
(45) Date of Patent: Sep. 17, 2024

(54) CAPACITIVE SENSING

(71) Applicant: NXP USA, INC., Austin, TX (US)

(72) Inventor: Vaclav Bajgar, Ostrava (CZ)

(73) Assignee: NXP USA, INC., Austin, TX (US)

( * ) Notice: Subject to any disclaimer, the term of this patent is extended or adjusted under 35 U.S.C. 154(b) by 867 days.

(21) Appl. No.: 16/872,999

(22) Filed: May 12, 2020

(65) Prior Publication Data

US 2021/0356297 A1 Nov. 18, 2021

(51) Int. Cl.
    *G01D 5/24* (2006.01)
    *G06F 3/041* (2006.01)
    *G06F 3/044* (2006.01)

(52) U.S. Cl.
    CPC ............. *G01D 5/24* (2013.01); *G06F 3/0416* (2013.01); *G06F 3/044* (2013.01)

(58) Field of Classification Search
    CPC .......... G01D 5/24; G06F 3/0416; G06F 3/044
    See application file for complete search history.

(56) References Cited

U.S. PATENT DOCUMENTS

| | | | | |
|---|---|---|---|---|
| 4,360,850 A | * | 11/1982 | Howard | H02H 3/087 361/54 |
| 5,554,890 A | * | 9/1996 | Kinoshita | B60R 21/017 340/436 |
| 8,552,994 B2 | | 10/2013 | Simmons | |
| 8,836,350 B2 | * | 9/2014 | Peter | H03K 17/955 345/173 |
| 9,823,798 B2 | * | 11/2017 | Cholasta | G06F 3/0416 |
| 2008/0179772 A1 | * | 7/2008 | Dichtl | B29C 44/351 425/111 |
| 2017/0351359 A1 | * | 12/2017 | Lo | A63H 3/28 |

OTHER PUBLICATIONS

Perme, T., "Capacitive Touch Using Only an ADC ("CVD")", Microchip Technology, Inc.; AN1298: Mar. 2009.

* cited by examiner

*Primary Examiner* — Alexander Satanovsky
*Assistant Examiner* — Sharah Zaab
(74) *Attorney, Agent, or Firm* — David G. Dolezal

(57) ABSTRACT

As disclosed herein, circuitry and a method for providing a digitized voltage value of one capacitive sensor in which a second capacitive sensor is utilized for charge equalization. After charge equalization, an analog to digital converter (ADC) provides a digital value representative of the voltage of the one sensor.

14 Claims, 4 Drawing Sheets

CAPACITIVE SENSING

BACKGROUND OF THE INVENTION

Field of the Invention

This invention relates in general to capacitive sensing.

Background

Capacitive sensing utilizes capacitive technology to detect a stimulus or provide a measurement. A capacitive sensor is a device that becomes capacitively coupled with a conductive or dielectric external object and whose capacitance changes with the movement of the external object with respect to the capacitive sensor.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

The following sets forth a detailed description of a mode for carrying out the invention. The description is intended to be illustrative of the invention and should not be taken to be limiting.

As disclosed herein, circuitry and a method for providing a digitize voltage value of one capacitive sensor in which a second capacitive sensor is utilized for charge equalization. After charge equalization, an analog to digital converter (ADC) provides a digital value representative of the voltage of the one sensor that is indicative of the capacitance of the sensor. With some embodiments, providing such a system may allow for a reduction in the number of external terminal (e.g. pins, pads, bumps) of an integrated circuit to be reduced where only one terminal is needed for each capacitive sensor. Also, some embodiments may allow for multiple phases of a routine to be performed concurrently for multiple pairs of capacitive sensors with a multiplexed ADC. Also, with some embodiments, the digitized value can be used to determine whether either of the two capacitive sensors have been activated.

Figure 1:
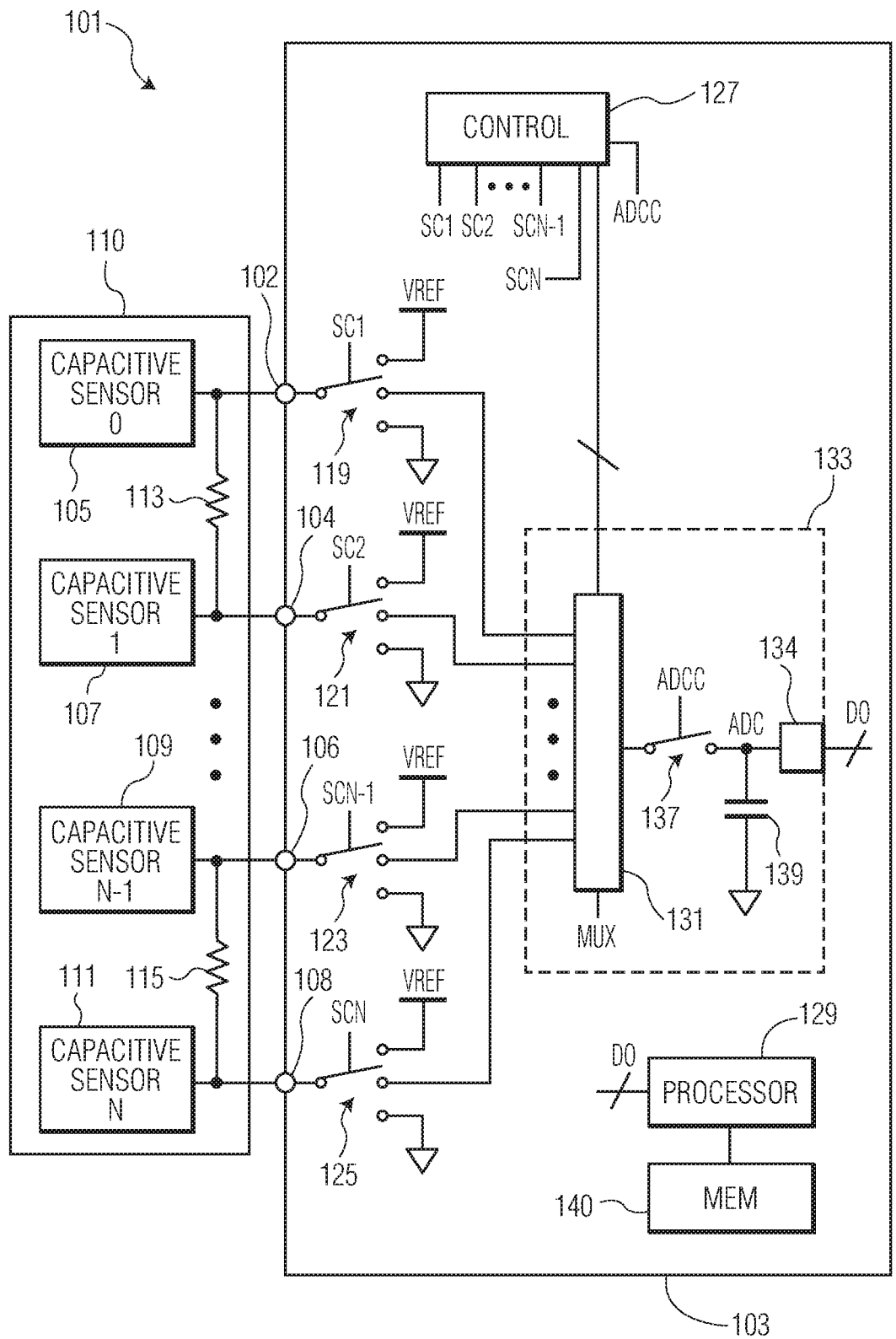
FIG. 1 is a circuit diagram of an electronic system according to one embodiment of the present invention.

FIG. 1 is a circuit diagram of an electronic system 101 according to one embodiment of the present invention. In the embodiment shown, system 101 includes a capacitive sensor array 110 that includes an N number of capacitive sensors (105, 107, 109, and 111). In some embodiments, array 110 is part of a touch screen. In one embodiment, each capacitive sensor may represents a "button" location on the touch screen such as a specific number, letter, or device command button that a user activates by touching the location. For example, the touch screen may be implemented on an appliance (e.g. refrigerator, microwave, washer), in an automobile, in an HVAC controller, or at a kiosk (e.g. an ATM machine). When a finger or stylus comes in close proximity to or touches the capacitive sensor, the capacitance of the sensor changes to indicate that the function of that sensor is desired to be activated. However, in other embodiments, array 110 may be implemented in other types of systems e.g. in measurement device such as a level detector where each electrode represent a measurement increment.

Different types of capacitive sensors may be utilized in different embodiments. In one embodiment, the capacitive sensors are self or absolute capacitance type sensors where an object (e.g. a finger or stylus) loads the sensor or increases the capacitance to ground by adding capacitance in parallel. In other embodiments, an object in close proximity to a sensor lowers the parasitic capacitance to ground. In other embodiments, the capacitive sensors are mutual capacitance type sensors where an object alters the mutual coupling between row and column electrodes.

System 101 also includes electronic circuitry for determining whether a capacitive sensor has been activated, which in one embodiment is implemented in an integrated circuit 103. In one embodiment, integrated circuit 103 is a microprocessor that includes a processor 129, an analog to digital converter (ADC) 133, and a number of external terminals with terminals 102, 104, 106, and 108 being connected to sensors 105, 107, 109, and 111, respectively. Circuit 103 also includes switch circuits 119, 121, 123, and 125 which are connected to terminals 102, 104, 106, and 108, respectively, for controlling the coupling of the terminals to voltage terminal VREF, voltage terminal ground, or to a channel of ADC 133. In the embodiment shown, the switch circuits 119, 121, 123, and 125 are three position switches. In some embodiments, the switch circuits may be implemented with transistors (e.g. NFET, PFET) and/or one or more pass gates.

In the embodiment shown, ADC 133 includes a multiplexer 131 with inputs connected to each switch circuit 199, 121, 123, and 125. The output of the multiplexer 131 is connected to switch 137. In the embodiment shown, ADC 133 includes a sample and hold capacitor 139 for sampling a voltage at the output of multiplexer 131 when switch 137 is closed. ADC 133 includes a digitizer 134 for providing a digital representation of the sampled analog voltage on capacitor 139. Digitizer 134 may implement one of a number of types of digitization converters such as a successive approximation converter, a Sigma-Delta converter, a dual slope converter, an integrating converter, a direct conversion converter, or a flash converter. In some embodiments, ADC 133 does not include a sample and hold capacitor 139.

Integrated circuit 103 includes a controller 127 for controlling the operation of the ADC 133 and switch circuits 119, 121, 123, and 125 during routines to determine the capacitance of the capacitive sensors 105, 107, 109, and 111 by producing digitize values of their voltage levels. Controller generates switch signals (SC1, SC2, SCN-1, and SCN) to control the switch circuits (119, 121, 123, and 125), a multiplexer control signal to control multiplexor 131, and a control signal (ADCC) to control switch 137. In some embodiments, the functions of controller 127 are performed by processor 129.

During the voltage determining routines, each capacitive sensor is coupled to another capacitive sensor of array 110 through a resistor (113, 115) to perform charge equalization of the sensor with the other sensor to equalize the charge on the sensors. For example, capacitive sensor 105 is coupled to capacitive sensor 107 through resistor 113. In one embodiment, resistors 113 and 115 are each 4.7K ohms, but may be of other values in other embodiments. In one embodiment, a conductive electrode of the capacitive sensor (105) is connected to resistor (113) and to the external terminal (102). In one embodiment, the capacitive sensor pairs coupled by a resistor are located adjacent to each other in array 110. In other embodiments, the capacitive sensors of the pair are located at non-adjacent locations from each other so that two paired capacitive sensors would not be activated at the same time. In some embodiments, the sensors of a pair would be located in different sensor arrays. In one embodiment, the sensors of a pair are located on different touchscreens.

Figure 2:
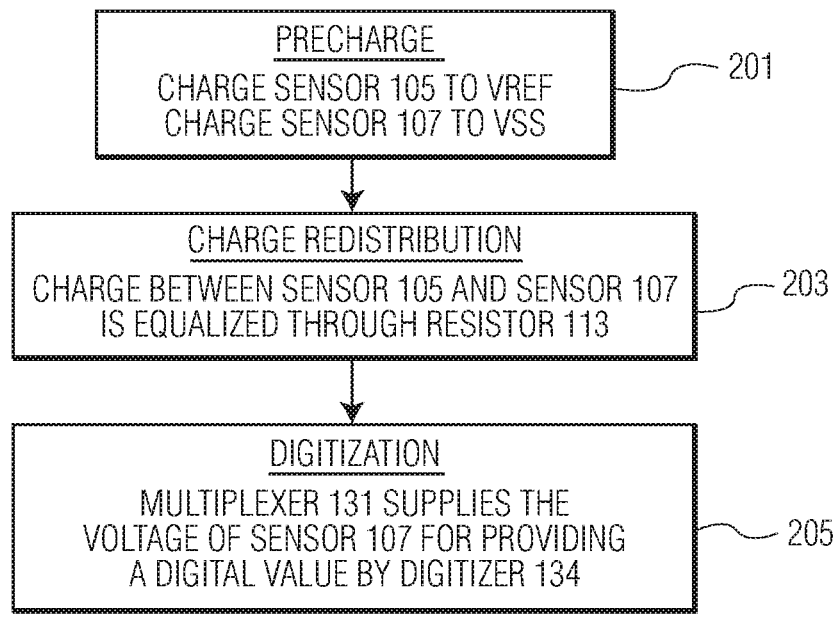
FIG. 2 is a flow chart showing an operation of the electronic system of FIG. 1 according to one embodiment of the present invention.

FIG. 2 is a flow diagram showing the phases of a measuring routine for providing a digital voltage value indicative of a capacitance of capacitive sensor 107. In a precharge phase 201, capacitor sensor 105 is charged to a reference voltage VREF and capacitor sensor 107 is charged to VSS (discharged to ground in the embodiment shown).

Figure 3:
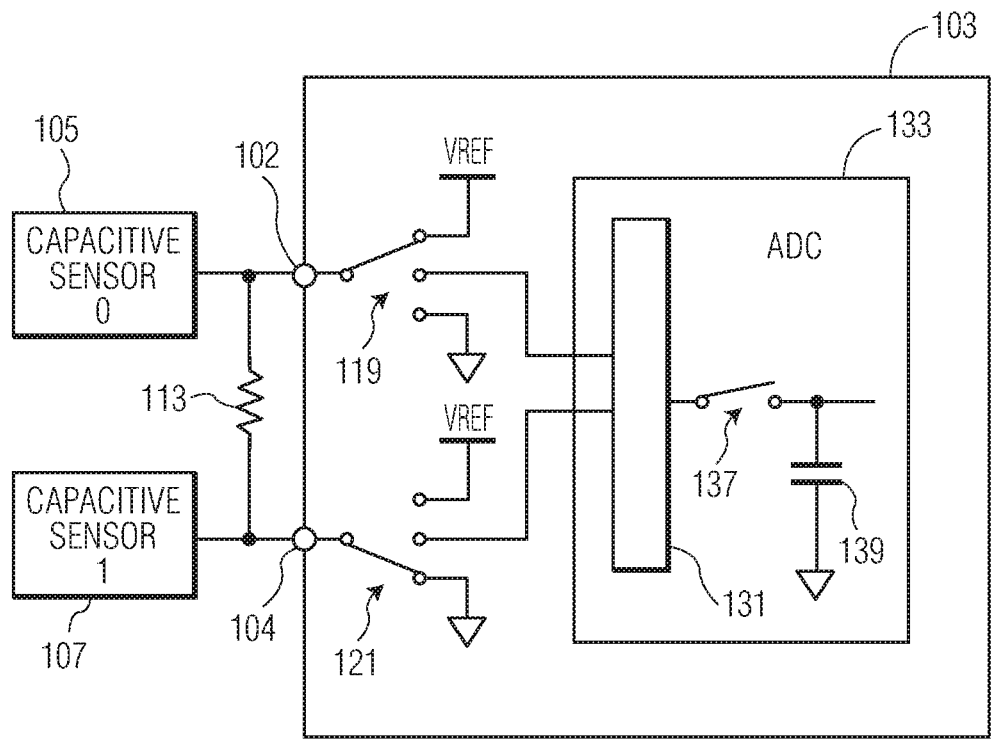
FIG. 3 is a circuit diagram of portions of the electronic system of FIG. 1 during a precharge phase according to one embodiment of the present invention.

FIG. 3 is a circuit diagram showing portions of system 101 during the precharge phase for digitizing the voltage of sensor 107. As shown in FIG. 3, switch circuit 119 is in a position to provide the voltage VREF to sensor 105 through external terminal 102. Switch circuit 121 is a position to ground capacitor sensor 107 through external terminal 104. In one embodiment, electrodes of sensors 105 and 107 are pulled to VREF and ground, respectively, with these switch circuit configurations.

In one embodiment, VREF is the same voltage as VDD, which is the system supply voltage (e.g. 5 volts) supplied to integrated circuit 103 and array 110. In other embodiments, VREF is different than VDD. In some instances, VREF is higher than VDD (e.g. with a charge pump used to provide VREF). In some embodiments, the higher the VREF, the greater the electromagnetic field of the sensor and the better the sensitivity. In some embodiments, the switch circuits (119 and 121) are connected to a negative charge pump instead of system ground to provide a negative voltage to one sensor (e.g. sensor 107 in FIG. 3) during the precharge phase. In some embodiments, the voltage range supplied to the capacitive sensors during the precharge phase would match the voltage range supplied to ADC 133.

Referring back to FIG. 2, in the charge redistribution phase 203, charge between sensor 105 and sensor 107 is equalized through resistor 113. As used herein, "equalized" means that because of the charge redistribution, the charge is the same or nearly the same on the two capacitive sensors.

Figure 4:
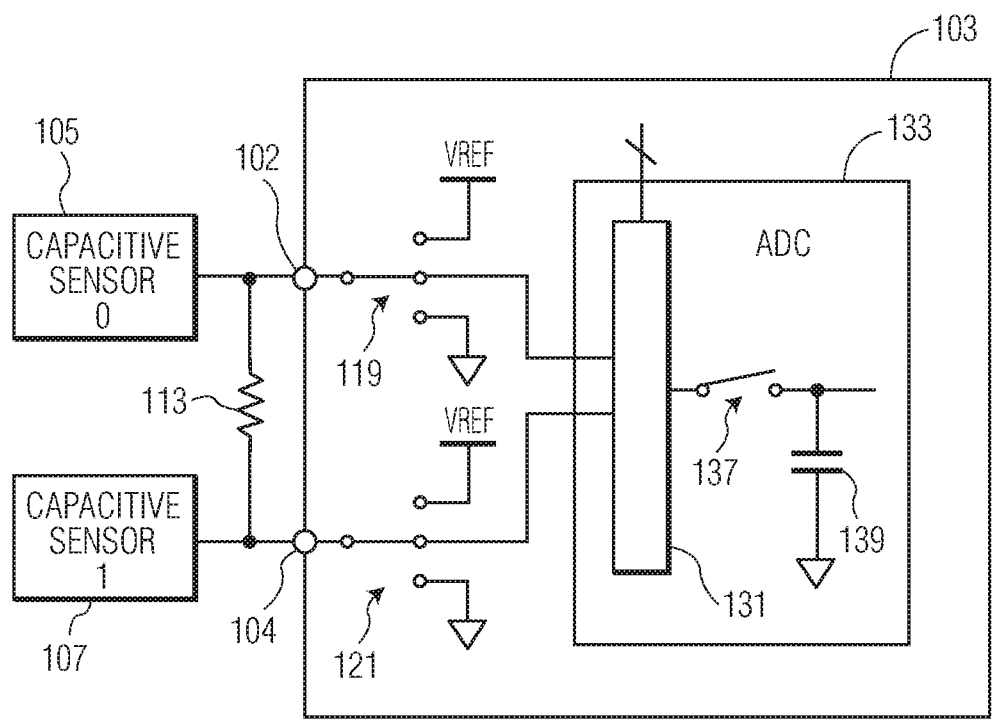
FIG. 4 is a circuit diagram of portions of the electronic system of FIG. 1 during a charge redistribution phase according to one embodiment of the present invention.

FIG. 4 is a circuit diagram showing portions of system 101 in the charge redistribution phase 203. During the charge redistribution phase, charge from sensor 105 flows to sensor 107 through resistor 113 until the charge equalizes on both. During this time, switch circuits 119 and 121 are shown in a position such that terminals 102 and 104 have a current path to the inputs of multiplexer 131. However, at this time, the inputs of multiplexer 131 connected to switch circuits 119 and 121 are not selected to be provided to the output of multiplexer 131 and/or switch 137 is open such that terminals 102 and 104 see a high impedance into integrated circuit 103. Accordingly, almost no charge from sensor 105 flows into integrated circuit 103 during the charge redistribution phase 201.

Referring back to FIG. 2, during the digitization phase 205, ADC 133 provides a digital indication of the voltage level of capacitive sensor 107.

Figure 5:
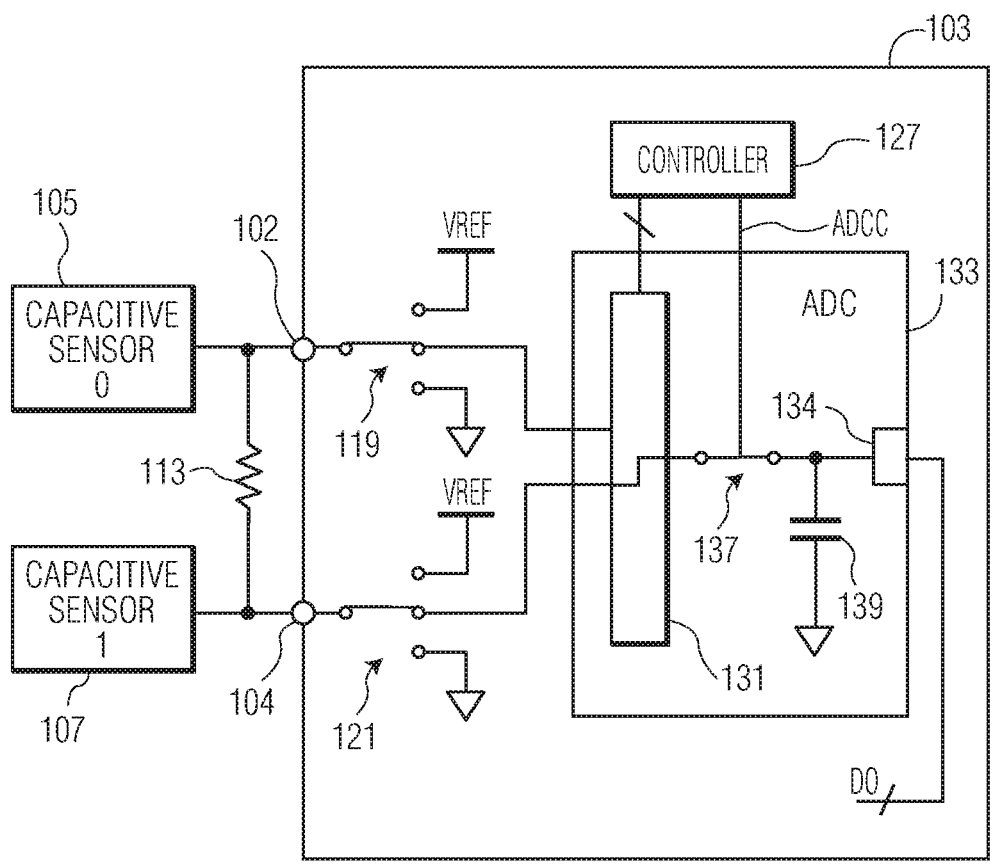
FIG. 5 is a circuit diagram of portions of the electronic system of FIG. 1 during a digitization phase according to one embodiment of the present invention.

FIG. 5 is a circuit diagram showing portions of system 101 in digitization phase 205. During this phase, switch circuit 121 is in a position to provide a current path between external terminal 104 and an input of multiplexer 131. Also, controller 127 places the control signals to multiplexer 131 in a state such that multiplexer 131 will connect the mux input coupled to capacitive sensor 107 to the output of multiplexer 131. Controller 127 also closes switch 137 so that the output of multiplexer 131 can be provided to sample and hold capacitor 139 and digitizer 134 can produce a digital indication of the voltage level of capacitive sensor 107 at its output DO. In one embodiment, processor 129 receives the digital representation of the voltage of senor 107 and uses it to calculate the capacitance of sensor 107.

In some embodiments, processor 129 just determines whether the voltage V1 is below an activation threshold that indicates whether sensor 107 is being activated or not. In some of these embodiments, the specific capacitance value is not utilized in further processing by processor 129 beyond determining whether the threshold has been met. In still other embodiments, processor 129 determines whether the voltage of V1 is above an activation threshold that indicates that sensor 105 is being activated. In other embodiments, processor 129 is determining whether there is a change in the measured voltages which indicates a change in capacitance.

During the charge redistribution phase 201, the amount of charge that flows into capacitive sensor 107 from capacitive sensor 105 is dependent upon the capacitance of sensor 105 at that time. In one embodiment, if sensor 105 is being activated (e.g. a conductive object is touching or is in close proximity to the area of array 110 corresponding to sensor 105 as when a user wants to select a "button" corresponding to sensor 105), then the capacitance of sensor 105 will increase. Because of its increased capacitance, sensor 105 will be able to hold more charge during the precharge phase 201. Accordingly, more charge will flow into sensor 107 during the charge redistribution phase. If sensor 105 is not being activated, then less charge will flow into sensor 107.

In one embodiment, the voltage of a sensor after charge redistribution is a function of the capacitance of the sensor and the amount of charge being stored in the capacitor. In one embodiment, the closer a conductive object is to a capacitive sensor, the higher the capacitance of the sensor. The higher the capacitance of a capacitive sensor, the more charge it will take to raise the voltage of the sensor as a result of charge equalization. The smaller the capacitance, the less charge it will take to raise the voltage.

Thus, in one embodiment for the case of FIG. 2 (assuming that the other sensor 105 of the pair is not being activated), a lower voltage after equalization of sensor 107 means that the capacitance of sensor 107 is higher due to an object being close to the sensor (such as when sensor 107 is being activated). Conversely, a higher voltage on sensor 107 after equalization means that the capacitance of sensor 107 is lower due to no object being close to the sensor (it is not being activated) (assuming that sensor 105 is not being activated either).

In one embodiment during the precharge phase 201, the amount of charge (Q) applied to sensor 105 as a result of precharging to voltage VREF is shown below, where C105 is the capacitance of sensor 105:

$$Q = C105 * VREF; \quad (EQ1)$$

During the charge redistribution phase 203, the charge (Q) is equalized with sensor 107 (whose capacitance is shown as C107 and whose measured voltage after equalization is shown below as V1eq):

$$Q = (C105 + C107) * V1eq; \quad (EQ2)$$

By substituting the two above equations and performing mathematical manipulation, an equation for the capacitance of sensor 107 (C107) can be found:

$$C105 * VREF = (C105 + C107) * V1eq; \quad (EQ3)$$

$$C107 * V1eq = C105 * (VREF - V1eq); \quad (EQ4)$$

$$C107 = C105 * (VREF - V1eq) / V1eq; \quad (EQ5)$$

In some embodiments, processor 129 implements equation 5 to measure the absolute capacitance of a sensor (e.g. 107) (assuming that the other sensor of the pair (e.g. 105) is not being activated during that time). The capacitance C105 of sensor 105 can be determined through a startup routine where the capacitance of each sensor of array 110 can be measured when no object is near the sensor array 110. In other embodiments, C105 can be stored in memory 140 during system manufacture. Those capacitance values can be used by processor 129 along with the measured voltage V1eq to calculate C107 during operation to determine the capacitance of sensor 107. In some embodiments, processor 129 utilizes the measured voltage to derive a capacitance from a table stored in memory 140.

Because in some embodiments, the voltages of both sensors of a pair are the equivalent after equalization, the measurement of the voltage of one sensor (e.g. sensor 107) by the routine of FIG. 2 can also be used to determine the capacitance of the other sensor of the pair (105). As derived from the equations above, the capacitance of sensor 105 is:

$$C105 = (C107 * V1eq) / (VREF - V1eq); \quad (EQ6)$$

In some embodiments where the voltages on each sensor of the sensor pair are equivalent after equalization and the capacitance of the sensors when not activated are similar, the routine of FIG. 2 can be used to determine whether either of sensor 105 or sensor 107 is being activated from the measured voltage of sensor 107 during the digitization phase. As derived from equation 3 above:

$$V1eq = (C105 * VREF) / (C105 + C107); \quad (EQ7)$$

As shown from equation 7, if neither sensor 105 nor sensor 107 is being activated during the routine of FIG. 2, then 01 will approximately equal C0 and the measured voltage V1EQ will approximately equal VREF/2. If sensor 105 is activated and sensor 107 is not, then capacitance C105 is greater than capacitance C107 and (as per equation 7 above), the measured voltage V1EQ will be greater than VREF/2. If sensor 107 is activated and sensor 105 is not, then the measured voltage V1EQ will be less than VREF/2. If both sensor are activated to the same degree, then V1EQ will approximately be VREF/2. However, in some systems, such as with numeric touch pad, activating two sensors at one time is an erroneous condition.

Accordingly, with some embodiments described herein, comparing the measured voltage Veq1 with a threshold above VREF/2 and with a threshold below VREF/2, allows for the routine of FIG. 2 to be used to determine whether either sensor of the sensor pair has been activated.

Figure 6:
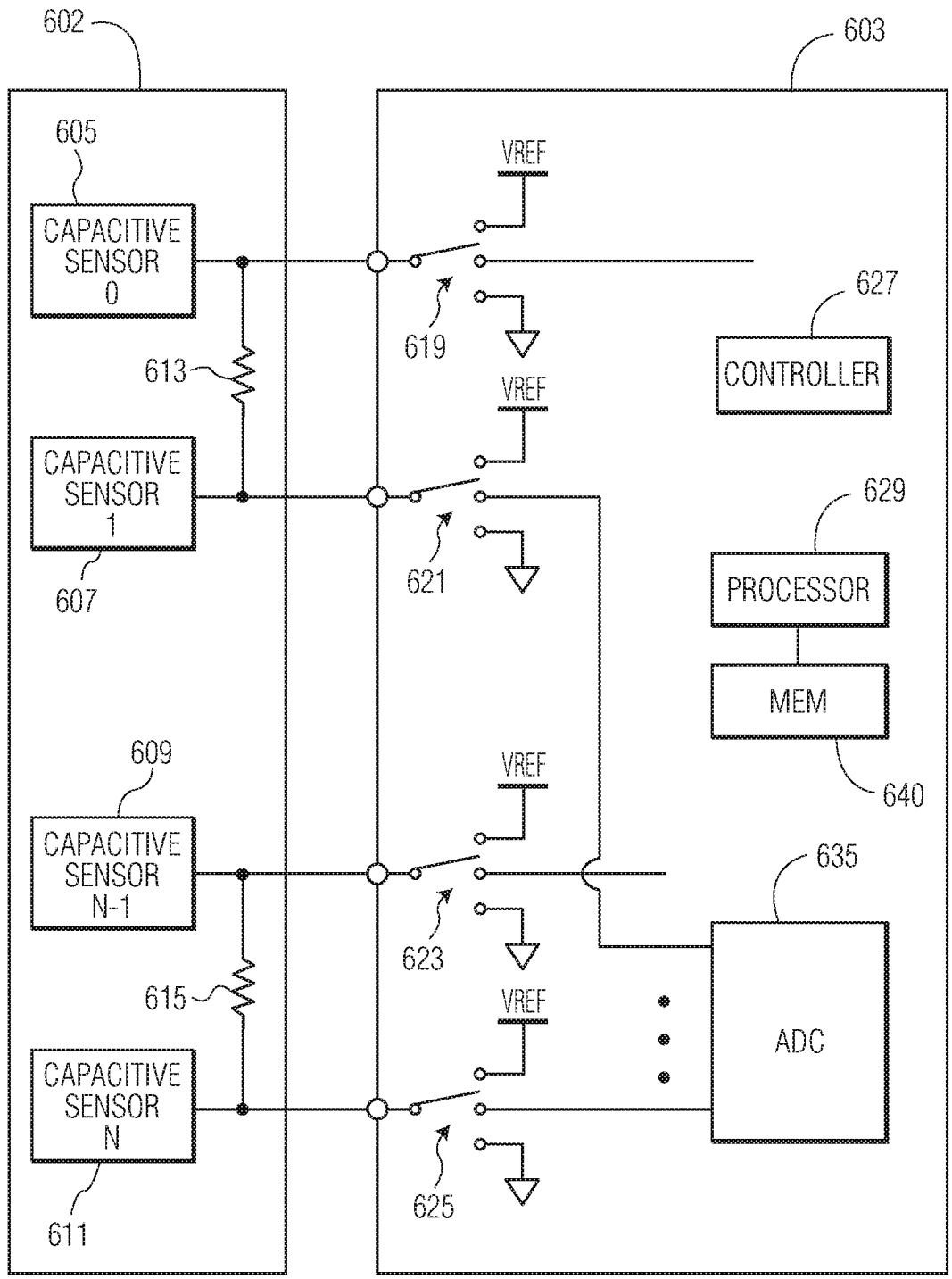
FIG. 6 is a circuit diagram of an electronic system according to another embodiment of the present invention.

FIG. 6 is a circuit diagram of an electronic system according to another embodiment of the present invention. The embodiment of FIG. 6 is similar to the embodiment of FIG. 1 except that only one capacitive sensor of each capacitive sensor pair is connected to an ADC (ADC 635). Although not shown in FIG. 6, ADC 635 includes a multiplexer, switch, sample and hold capacitor, and a digitizer similar to multiplexer 131, switch 137, sample and hold capacitor 139, and digitizer 134 of ADC 133 of FIG. 1. Array 602 includes a number of capacitive sensors with sensors 605, 607, 609, and 611 being shown in FIG. 6. Integrated circuit 603 includes switch circuits 619, 621, 623, and 625 which are similar to switch circuits 119, 121, 123, and 125. However, switch circuits 619 and 623 are not connected to an ADC. Integrated circuit 603 includes a processor 629 and a memory 640. Integrated circuit 603 includes a controller 627 similar to controller 127 of integrated circuit 103 for controlling the operations of switch circuits 619, 621, 623, and 625 and ADC 635 during voltage measurement routines. The signals outputted by controller 627 are not shown in FIG. 6. Integrated circuit 603 may have different configurations in other embodiments.

In the embodiment shown, integrated circuit 603 performs the routine of FIG. 2 for each sensor pair (e.g. sensors 605 and 607) and reads the voltage of the sensor (607) of the pair whose switch circuit (621) is connected to ADC 635. Processor 629 then compares whether the measured voltage is 1) an activation threshold above VREF/2 to indicate that one sensor of the pair is being activated, 2) an activation threshold below VREF/2 to indicate that the other sensor of the pair is being activated, or 3) between the two activation thresholds indicating that neither of the sensors is being activated.

In some embodiments, capacitances of the current paths and the capacitance of the sample and hold capacitor (139) may affect the value of the measured voltage read during the routine of FIG. 2. Thus, in some embodiments, the measured voltage (VEQ) indicative of both sensors of a pair not being activated may be different from VREF/2. In these embodiments, processor 629 would compare whether the measured voltage is an activation threshold above VEQ to indicate that one sensor of the pair is being activated or an activation threshold below VEQ to indicate that the other sensor of the pair is being activated. In some embodiments, VEQ is determined during system manufacture and stored in memory 640 or is determined during a system startup routine when no sensors are being activated.

In some embodiments, the activation thresholds are based on a percentage of VREF or a percentage of VEQ (e.g. in one embodiment, the activation threshold voltages are approximately 1.25 VEQ and 0.75 VEQ). In other embodiments, the activation thresholds are a fixed value above and below VEQ or VREF (e.g. VEQ−30 mV, VEQ+30 mV). In some embodiments, the activation threshold amount would be dependent on the thickness of the plastic or glass covering the sensors, the value of VREF, the capacitance of a non-activated sensor, and the granularity of the ADC.

One advantage of the circuit of FIG. 6 over the circuit of FIG. 1 is that for some embodiments, it takes only half of the time needed to determine if a capacitive sensor of array 602 has been activated in that the routine of FIG. 2 can be run one time to detect whether either sensor of a pair has been activated. Also, with the system of FIG. 6, only half of the ADC channels of ADC 635 are needed for sensor activation detection.

Referring back to FIG. 2, in the embodiment shown, sensor 105 is charged to VREF and sensor 107 is grounded during the precharge phase 201 and the voltage of sensor 107 is read during the digitization phase to determine the capacitance of sensor 107. However, in other embodiments, sensor 107 may be charged to VREF and sensor 105 may be grounded during the precharge phase. Also, in some embodiments, the voltage of sensor 105 may be read during the digitization phase to determine the capacitance of sensor 107.

In some embodiments of system 101, after the performance of the routine of FIG. 2 for obtaining a digitized voltage indicative of the capacitance of sensor 107, circuit 103 uses the routine of FIG. 2 to obtain a digitized voltage indicative of the capacitances of the other capacitive sensors in array 110. For example, after the routine of FIG. 2 for sensor 107 is run, the routine can be run to obtain a voltage indicative of a capacitance for sensor 105. In this routine, senor 107 would be precharged to VREF and sensor 105 would be grounded in phase 201. In phase 205, the voltage level of sensor 105 would be digitized.

For system 101, after the voltage of sensor 105 has been measured with the routine of FIG. 2, the capacitance indicative voltages of the other capacitive sensors (e.g. 109 and 111) would be measured using the routine of FIG. 2. For example, to measure the voltage of sensor 111, sensor 109 would be charged to VREF and sensor 111 would be charged to VSS during precharge phase 201. After all of the sensors have been check, controller 127 would cycle back through the sensors of array 110 to check the capacitance indicative voltage levels as per the routine of FIG. 2 to determine whether any of the sensors have been activated. In some embodiments, the sensors of each pair would be checked consecutively in the order. However, in other embodiments, the sensors of each pair would not be checked consecutively in the order.

For the embodiment of FIG. 6, after the routine of FIG. 2 is run to check whether either of sensors 605 or 607 has been activated, the routine would be run for the other sensor pairs (e.g. 609 and 611). After all of the sensor pairs have been checked, each of the pairs would be checked again.

One advantage that may occur with the embodiments shown or described herein, is that because the systems do not utilize a sample and hold capacitor (139) of a ADC during the precharge and equalization phases, an ADC (133, 635) may perform the digitalization phase 201 for one sensor of a sensor pair while other sensor pairs are in the precharge phase 203 and/or the equalization phase 205. For example, while ADC 133 is providing a digital value for the voltage of sensor 107 in digitization phase 205, the sensor pair of sensors 109 and 111 are in precharge phase 201 and another sensor pair (not shown) of array 110 is in charge redistribution phase 203. Whereas if a system used sample and hold capacitor 139 for charge equalization, phases of the routine of FIG. 2 for the other sensors could not be performed concurrently. Thus, in some instances, a system that uses the sample and hold circuit for charge equalization may take three times as long to determine whether any of the sensors have been activated.

Another advantage that may occur over a system that uses a sample and hold capacitor (139) of an ADC for charge equalization is that the effectiveness of the system may be less dependent on the potential capacitance of the capacitive sensors versus the size of the capacitor of the sample and hold circuit. With some embodiments, the capacitive sensors of an array are typically the same size to where the capacitive values in an unactivated state would be relatively the same. Because the capacitance of the sensors are relatively the same size, charge equalization is performed more efficiently, enabling integrated circuit 103 to be used effectively with a wide range of capacitance sensor sized arrays. Whereas the effectiveness of a circuit that uses the sample and hold capacitor of an ADC for charge equalization would be restricted to arrays with sensors of a certain size. However, other embodiments of the present invention may operate with arrays of capacitive sensors of different capacitive sizes.

Furthermore, with respect to the embodiment of FIG. 6, a single instance of the routine of FIG. 2 can be used to determine if either of the two sensors are being activated. On the other hand, a system that utilizes a sample and hold capacitor (139) of an ADC for charge equalization would require that a read routine be run for each sensor to determine if the sensor has been read. Thus, with the embodiment of FIG. 6, the time to determine sensor activation of an array can be cut in half.

Although FIG. 2 shows a routine where the sensor being read is charged to a ground voltage during the precharge phase 201, in other embodiments, the sensor being read may be charge to other voltages during precharge (e.g. VDD, ½ VREF, a negative voltage). In some embodiments, the sensor being read (e.g. sensor 107 in FIG. 2) may be charged to VREF and the other sensor of the pair (e.g. sensor 105) may be grounded.

An electronic system may have other configurations in other embodiments. For example, in some embodiments, each sensor would have its own ADC (where the ADC would not include a multiplexer). In other embodiments, some of the circuitry of integrated circuit 103 or 603 may be located in different integrated circuits. In some embodiments, charge may be equalized among a greater number of capacitive sensors, wherein each capacitive sensor would be coupled with a resistor to more than one sensor. Also, in other embodiments, the switch circuits (119) may have a different configuration. In some embodiments, the determination of whether a sensor is being activated may be made by a logic circuit coupled to the ADC.

In some embodiments described herein, an electronic system may be implemented that allows for one external terminal per capacitive sensor, thereby allowing for the integrated circuit to sense the voltages of a greater number of capacitive sensors.

In one embodiment, a method of capacitive sensing includes charging a first capacitive sensor with a first voltage and a second capacitive sensor with a second voltage. The first voltage is different than the second voltage. The method includes after the charging, removing the first voltage from the first capacitive sensor and the second voltage from the second capacitive sensor and then equalizing a charge on the first capacitive sensor and the second capacitive sensor. The method includes after the equalizing, providing a digital indication of a sensed voltage level of the first capacitive sensor with an analog to digital converter.

In another embodiment, a circuit includes a plurality of external terminals, a plurality of switch circuits, at least one analog to digital converter, and control circuitry for configuring the circuit to perform a capacitive sensing routine for sensing capacitive sensors coupled to the plurality of external terminals. The control circuitry is configured to, during a precharge phase, control a first switch circuit of the plurality of switch circuits to charge a first external terminal of the plurality of external terminals to a first voltage and control a second switch circuit of the plurality of switch circuits to charge a second external terminal of the plurality of external terminals to a second voltage. The first voltage is different from the second voltage. The control circuitry is configured to after the charging, to control the first switch circuit to remove the first voltage from the first external terminal and control the second switch circuit to remove the second voltage from the second external terminal so that a capacitive sensor coupled to the first external terminal can equalize charge with a capacitive sensor coupled to the second external terminal. The control circuitry is configured to after the equalization, to control to provide a digital indication of a sensed voltage level of the first external terminal by an analog to digital converter of the at least one analog to digital converter.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A method of capacitive sensing, comprising:
   charging a first capacitive sensor with a first voltage and a second capacitive sensor with a second voltage, the first voltage is different than the second voltage;
   after the charging, removing the first voltage from the first capacitive sensor and the second voltage from the second capacitive sensor and then equalizing a charge on the first capacitive sensor and the second capacitive sensor;
   after the equalizing, providing a digital indication of a sensed voltage level of the first capacitive sensor with an analog to digital converter.

2. The method of claim 1 wherein the first capacitive sensor and the second capacitive sensor are part of a touchscreen array.

3. The method of claim 1 wherein the first voltage is lower than the second voltage.

4. The method of claim 3 wherein the first voltage is system ground.

5. The method of claim 1 wherein the first voltage is higher than the second voltage.

6. The method of claim 1 wherein the providing the digital indication includes providing a voltage of the first capacitive sensor through a multiplexer.

7. The method of claim 1 further comprising:
   charging the second capacitive sensor with the first voltage and the first capacitive sensor with the second voltage;
   after the charging, removing the first voltage from the second capacitive sensor and the second voltage from the first capacitive sensor and then equalizing a charge on the first capacitive sensor and the second capacitive sensor;
   after the equalizing, providing a digital indication of a sensed voltage level of the second capacitive sensor.

8. The method of claim 1 further comprising comparing the sensed voltage level of the first capacitive sensor with a threshold to determine whether the first capacitive sensor is being activated.

9. The method of claim 8 comparing the sensed voltage level of the first capacitive sensor with a second threshold to determine whether the second capacitive sensor is being activated.

10. The method of claim 1 further comprising comparing the sensed voltage level of the first capacitive sensor with a threshold to determine whether the second capacitive sensor is being activated.

11. The method of claim 1 wherein the sensed voltage level of the first capacitive sensor is indicative of a level of proximity of an object with respect to the first capacitive sensor.

12. The method of claim 1 wherein the sensed voltage level of the first capacitive sensor is indicative of a level of proximity of an object with respect to the second capacitive sensor.

13. The method of claim 1 wherein the equalizing is performed through a resistive circuit coupled in a path between the first capacitive sensor and the second capacitive sensor.

14. The method of claim 1 wherein the first capacitive sensor and the second capacitive sensor are part of a plurality of capacitive sensors, the method further comprises:
   periodically providing a digital indication of a sensed voltage level indicative of capacitance of each capacitive sensor of the plurality of capacitive sensors.

* * * * *